(12) United States Patent
Kim

(10) Patent No.: US 7,089,653 B2
(45) Date of Patent: Aug. 15, 2006

(54) APPARATUS FOR POSITIONING A SUNROOF ON A VEHICLE BODY

(75) Inventor: Young Chol Kim, Busan (KR)

(73) Assignee: Hyundai Motor Company, Seoul (KR)

( * ) Notice: Subject to any disclaimer, the term of this patent is extended or adjusted under 35 U.S.C. 154(b) by 315 days.

(21) Appl. No.: 10/750,655

(22) Filed: Dec. 31, 2003

(65) Prior Publication Data
US 2004/0237291 A1 Dec. 2, 2004

(30) Foreign Application Priority Data
May 27, 2003 (KR) ............. 10-2003-0033680

(51) Int. Cl.
*B23Q 7/00* (2006.01)

(52) U.S. Cl. .................. 29/711; 29/712; 29/784; 29/799; 29/822; 29/407.09; 29/407.1; 29/559; 29/281.4; 269/55; 269/58; 269/289 R; 269/909

(58) Field of Classification Search .............. 29/709, 29/711, 712, 721, 783, 784, 791, 799, 824, 29/281.5, 407.09, 407.1, 559, 822; 269/55, 269/58, 289 R, 303, 304, 909
See application file for complete search history.

(56) References Cited

U.S. PATENT DOCUMENTS

| 5,778,517 A * | 7/1998 | Amesbichler et al. ........ 29/709 |
| 6,481,078 B1 * | 11/2002 | Stone ....................... 29/281.5 |
| 2003/0070272 A1 * | 4/2003 | Zirbs ....................... 29/407.04 |

FOREIGN PATENT DOCUMENTS

| JP | 63-265785 | | 11/1988 |
| JP | 01208285 A | * | 8/1989 |
| JP | 02-17489 | | 2/1990 |
| JP | 2000-219170 | | 8/2000 |

* cited by examiner

*Primary Examiner*—Jermie E. Cozart
(74) *Attorney, Agent, or Firm*—Morgan Lewis & Bockius LLP

(57) ABSTRACT

A sunroof is automatically and precisely positioned to a mounting position by an apparatus including a floating plate movably mounted to a base member. A secondary lift structure is mounted to the floating plate and a centering cylinder unit is disposed between the secondary lift structure and the floating plate such that the centering cylinder unit aligns the floating plate to the sunroof mounting position on the vehicle body.

5 Claims, 6 Drawing Sheets

APPARATUS FOR POSITIONING A SUNROOF ON A VEHICLE BODY

CROSS-REFERENCE TO RELATED APPLICATIONS

This application claims priority of Korean Application No. 10-2003-0033680, filed on May 27, 2003, the disclosure of which is incorporated fully herein by reference.

FIELD OF THE INVENTION

Generally, the present invention relates to an apparatus for improving the assembly of an automobile. More particularly, the apparatus assists in positioning a sunroof for a vehicle accurately on the vehicle body.

BACKGROUND OF THE INVENTION

Typically, installation of a sunroof on a vehicle body requires moving the vehicle body to a sunroof mounting station, e.g., by a conveyor system. Upon arrival of the vehicle body, a worker manually retrieves the sunroof assembly from a pallet and, after positioning it on a sunroof mounting loader, manually moves the sunroof mounting loader and sunroof to a mounting position on the vehicle body.

Subsequently, the sunroof mounting loader lifts the sunroof to a working height and the worker manually installs the sunroof assembly on the vehicle. When installation of the sunroof assembly is complete the worker lowers the sunroof mounting loader and manually returns the sunroof mounting loader to its original position.

Typically, a vehicle body that arrives at the sunroof mounting station has longitudinal and/or transverse deviations from a predetermined standard position. In addition, when the sunroof mounting loader is moved toward the vehicle it also has such deviations from a predetermined position. Therefore, when the position of the vehicle body is excessively deviated from its target position the sunroof loader does not properly align the sunroof with the vehicle body and it becomes difficult for the worker to install the sunroof. Furthermore, the sunroof assembly is often a heavy object which further increases the difficulty in manual installation of the assembly.

The information disclosed in this Background of the Invention section is only for enhancement of the understanding of the background of the invention and should not be taken as an acknowledgement of any form or suggestion that this information forms the prior art that is already known to a person of ordinary skill in the art.

SUMMARY OF THE INVENTION

The present invention provides an apparatus for positioning a sunroof on a vehicle body regardless of a fed position of the vehicle body on an assembly line.

An exemplary apparatus for positioning a sunroof on a vehicle body includes a base member, a floating plate, a secondary lift structure, and a centering cylinder. The base member is mounted to a running rail such that the base member is movable along and vertical to the running rail. The floating plate is mounted to the base member interposing a plurality of ball bearings and a free cylinder, such that the floating plate is movable in longitudinal and transverse directions with respect to the base member. The floating plate has a centering attachment unit mounted thereon.

The secondary lift structure is mounted to the floating plate, interposing a secondary lift guider and a secondary lift cylinder, such that, the secondary lift structure is liftable with respect to the floating plate. The secondary lift structure includes a sunroof attachment unit and a primary lifting shaft.

The centering cylinder unit is disposed between the secondary lift structure and the floating plate such that the centering cylinder unit aligns the centering attachment unit on the floating plate to a sunroof mounting position of the vehicle body.

According to a further embodiment, the free cylinder is fixed to the base member and connected at its piston end to a fixing ring, such that the free cylinder firmly holds or moves a fixing member projected downward from the floating plate.

According to yet another embodiment, the primary lifting shaft includes a housing that is vertically mounted to the secondary lift structure interposing a bracket, a rod movably disposed in the housing, a pressuring cap disposed at an upper end of the rod, and a dog disposed at a lower end of the rod. In this case, it is preferable that a detection sensor is disposed below the dog, such that the detection sensor detects a lowering of the dog.

In another further embodiment, the centering cylinder unit includes a longitudinal centering cylinder and left and right centering cylinders. The centering attachment unit includes a longitudinal centering attachment member operated by the longitudinal centering cylinder and left and right centering attachment members, respectively operated by the left and right centering cylinders.

Such an exemplary apparatus for positioning a sunroof on a vehicle body can also be summarized to include a base member mounted on a running rail where the base member is movable both along and vertically with respect to the running rail. Furthermore, a floating plate is included and mounted to the base member. The floating plate is movable in longitudinal and transverse directions with respect thereto. The floating plate also has a centering attachment unit mounted thereon. Also included is a secondary lift structure mounted to the floating plate and liftable with respect to the floating plate, the secondary lift structure includes a sunroof attachment unit and a primary lifting shaft. A centering cylinder unit is disposed between the secondary lift structure and the floating plate such that the centering cylinder unit aligns the centering attachment unit on the floating plate to a sunroof mounting position of the vehicle body.

BRIEF DESCRIPTION OF THE DRAWINGS

The accompanying drawings, which are incorporated in and constitute a part of the specification, illustrate an embodiment of the invention, and, together with the description, serve to explain the principles of the invention. In the drawings.

DETAILED DESCRIPTION OF THE PREFERRED EMBODIMENTS

An embodiment of the present invention will hereinafter be described in detail with reference to the accompanying drawings.

Figure 1:
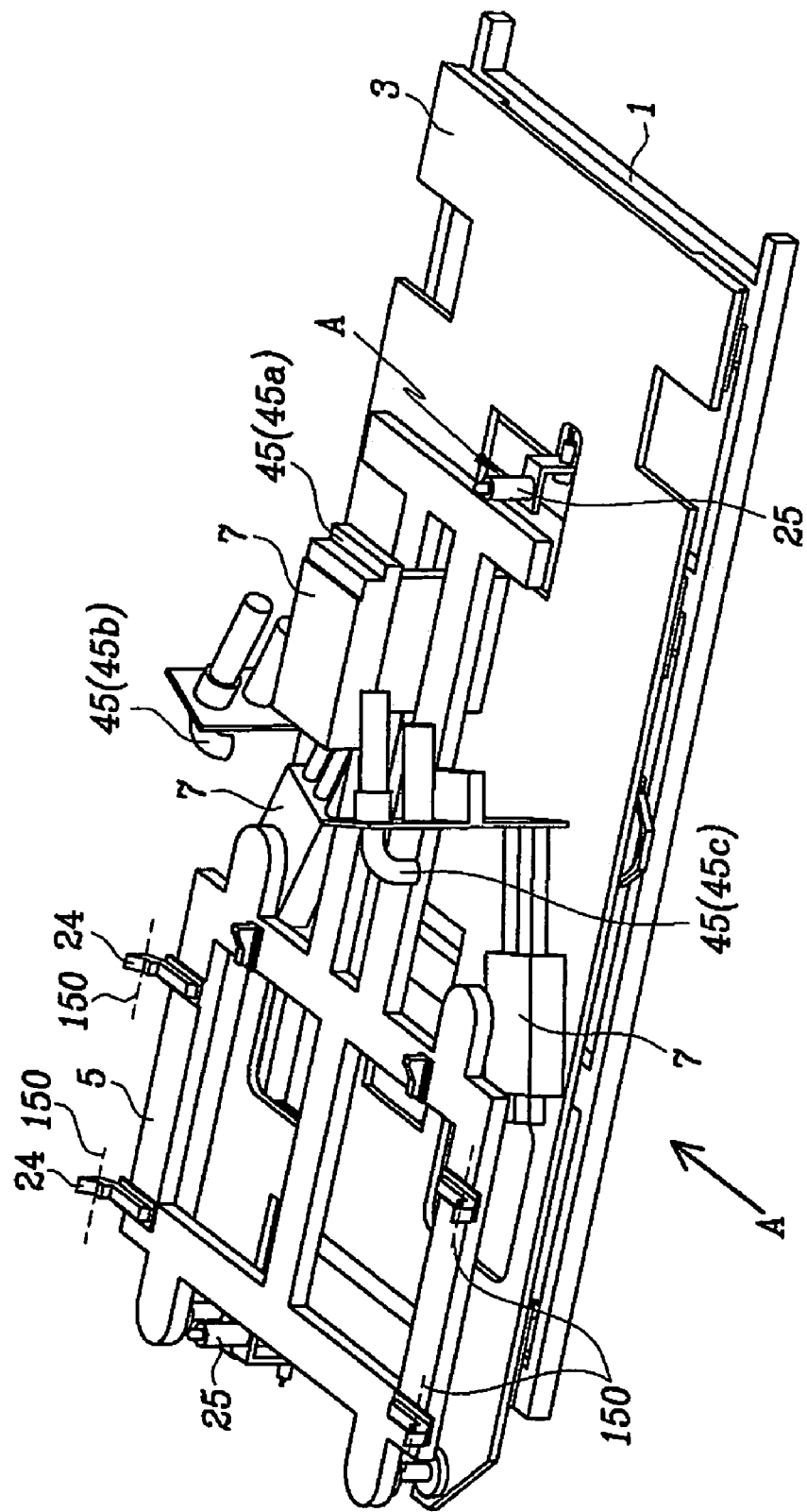
FIG. 1 is a perspective view of an apparatus for positioning a sunroof on a vehicle body according to an embodiment of the present invention.
Figure 2:
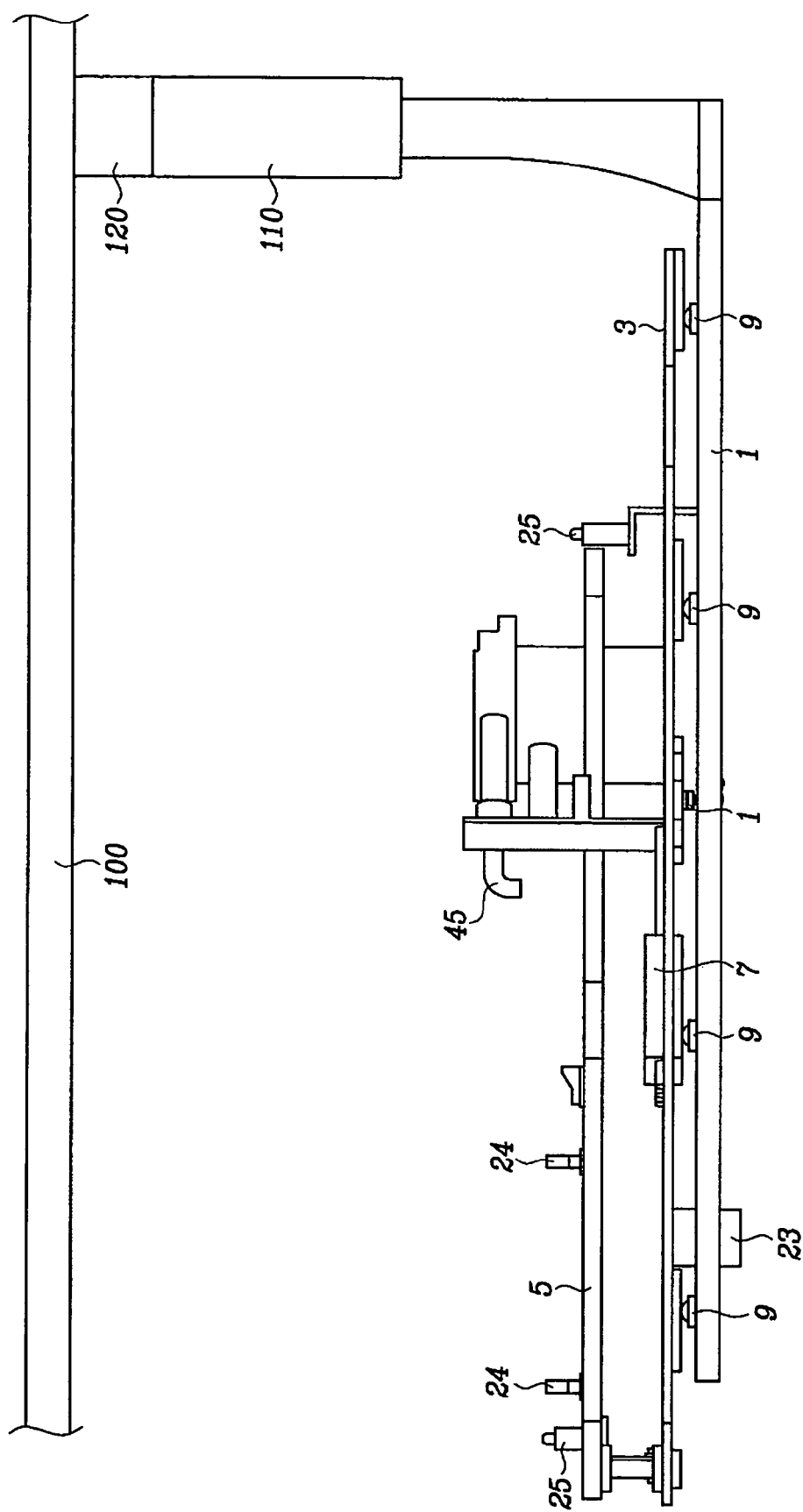
FIG. 2 is a lateral view of FIG. 1 in the direction of A.

As shown in FIG. 1, the apparatus for positioning a sunroof on a vehicle body generally includes a base member 1, a floating member 3, a secondary lift structure 5, and a centering cylinder unit 7. FIG. 2 shows the base member 1 is mounted to a running rail 100 that is disposed high above a sunroof-mounting station. The base member 1 is movable along the rail 100 by motor 120, and base member 1 can be raised and lowered by primary cylinder 110.

Floating plate 3 is provided generally parallel and near the base member 1. The floating plate 3 can control the secondary lift structure 5 for supporting a sunroof assembly 150 (FIG. 1), such that the secondary lift structure 5 can move in both longitudinal and transverse directions with respect to base member 1. In a preferred embodiment, floating member 3 is mounted to the base member 1 by a plurality of ball bearings 9 and a free cylinder 11 (FIG. 3), therefore, floating member 3 is free to move longitudinally and transversely with respect to base member 1. Preferably, for more stable movement of the floating plate 3, a plurality of ball bearings 9 are provided.

Figure 3:
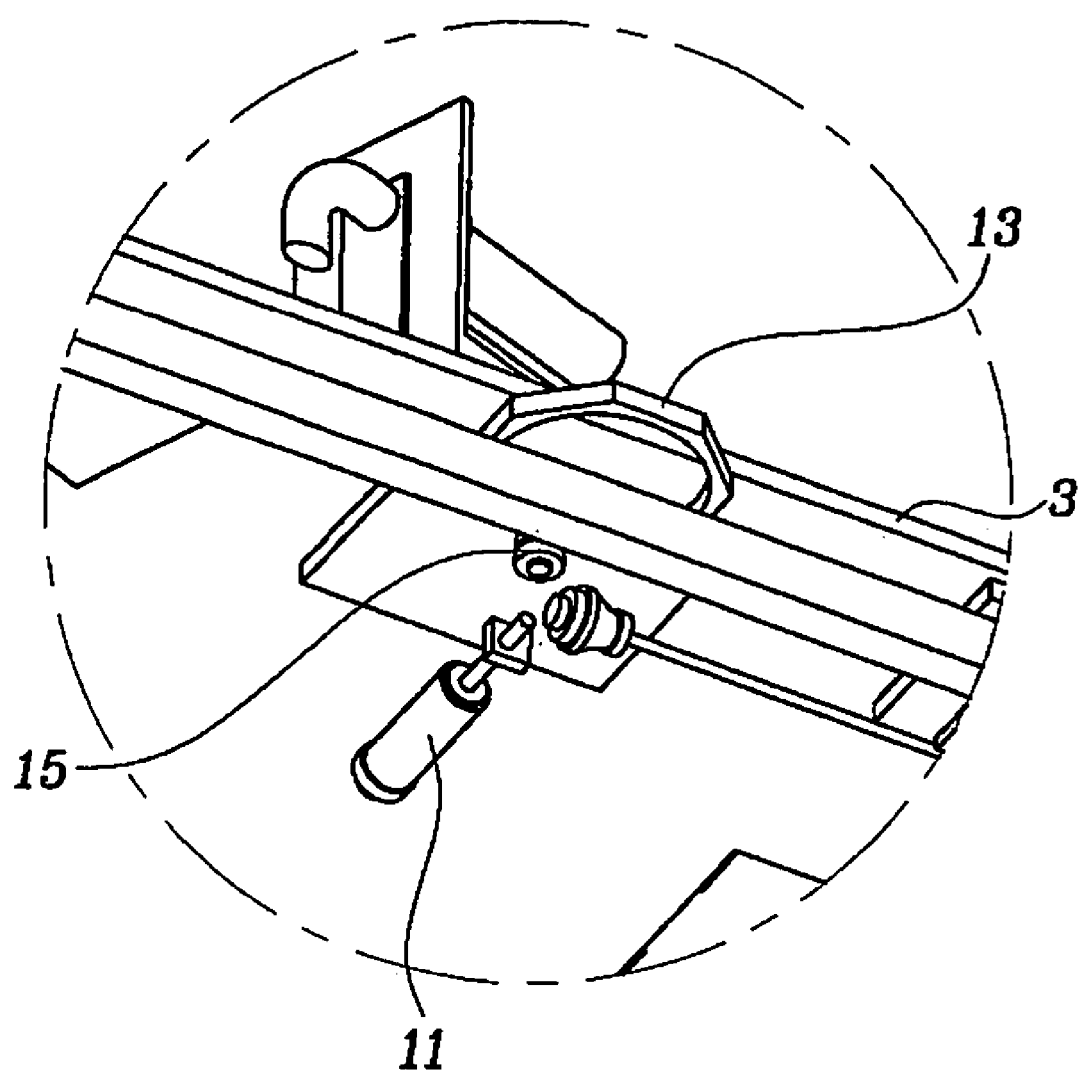
FIG. 3 is a detailed view of a free cylinder in an apparatus for positioning a sunroof on a vehicle body according to an embodiment of the present invention.

According to FIG. 3, free cylinder 11 is fixed to the base member 1. In operation, a lower portion of the floating plate 3 can be firmly held or freely moved. In other words, the free cylinder 11 is provided with at least one fixing ring 13 at or near the ends of its pistons. The fixing ring(s) 13 can firmly hold or freely move the floating plate 3 by manipulating a fixing member 15.

Figure 4:
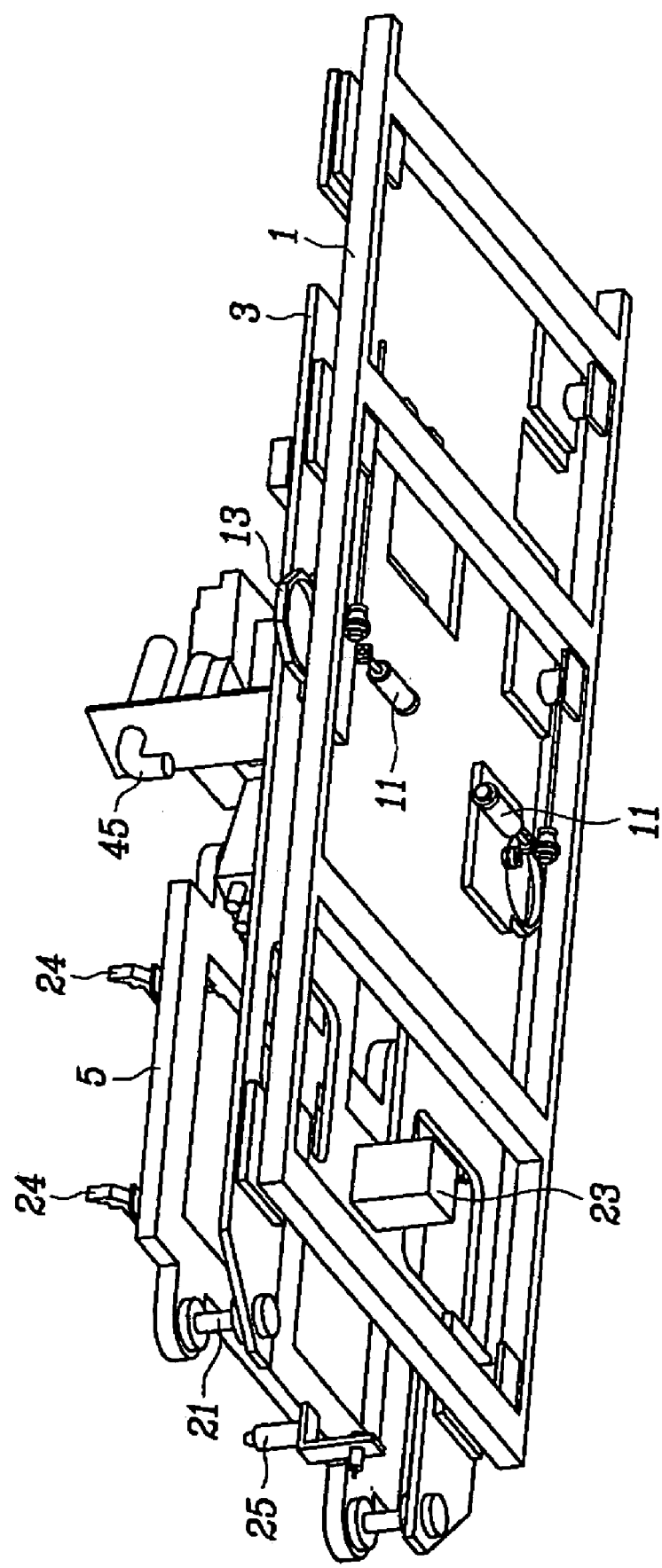
FIG. 4 is a perspective lower view of FIG. 1.

As shown in FIG. 4, the secondary lift structure 5 is installed above the floating plate 3. The secondary lift structure 5 is mounted to the floating plate 3 and interposing a secondary lift guider 21 and a secondary lift cylinder 23. It can, therefore, secondarily move in the vertical direction in addition to a primary movement according to the primary lift operation of the base member 1. Additionally, the secondary lift structure 5 includes a sunroof attachment unit 24 and a primary lifting shaft 25.

Figure 5:
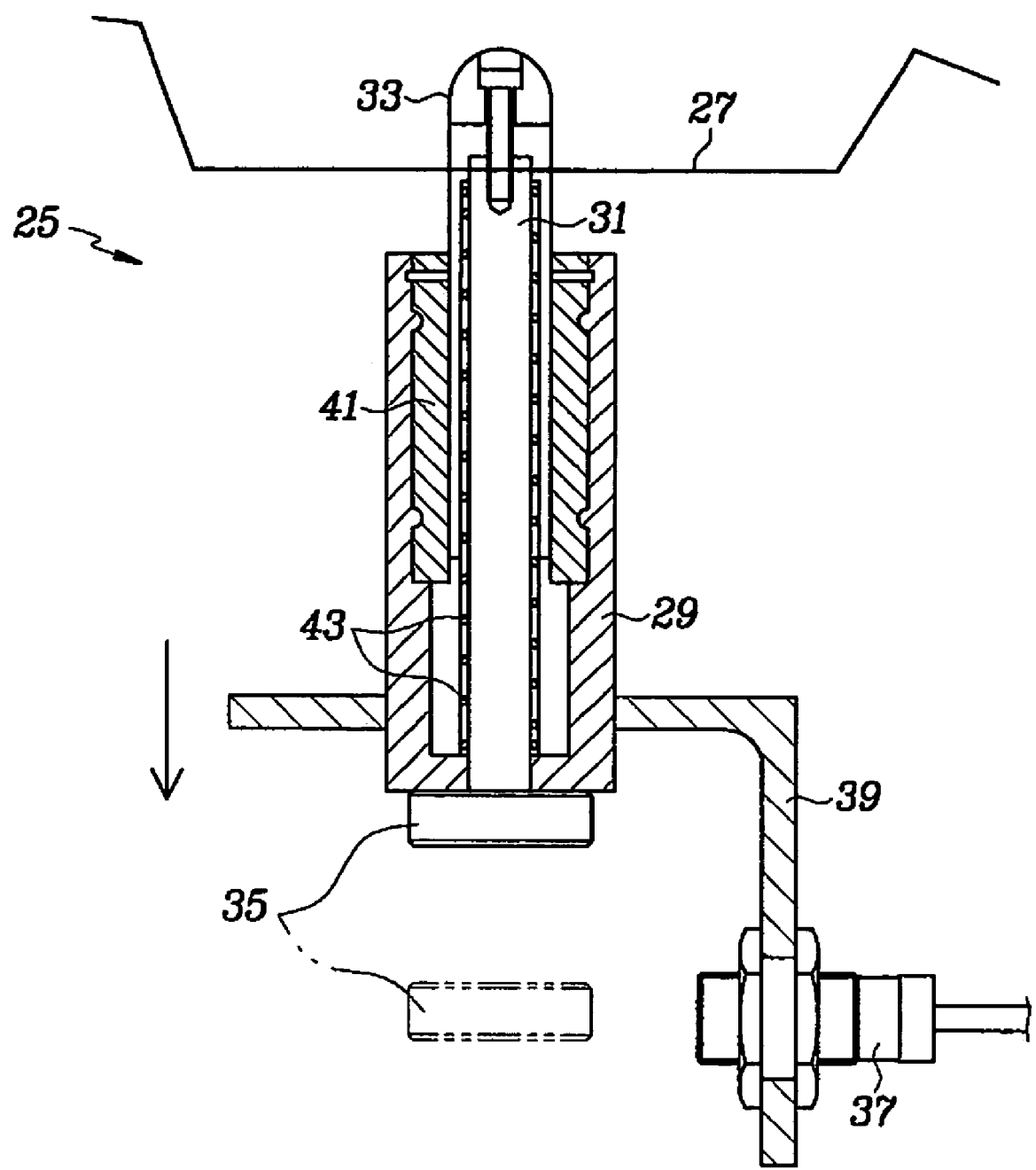
FIG. 5 is a sectional view showing operation of a sunroof attachment unit in an apparatus for positioning a sunroof on a vehicle body according to an embodiment of the present invention.

As shown in FIG. 5, the primary lifting shaft 25 is designed for directly holding a roof panel 27 of the vehicle body. For stable maneuvering of the secondary lift structure 5, a plurality of primary lifting shafts 25 are preferably provided at each of the front and rear sides of the secondary lift structure 5. According to an embodiment of the present invention, the primary lifting shaft 25 includes a housing 29, a rod 31, a pressing cap 33, a dog 35, and a detection sensor 37. The housing 29 is vertically mounted to the secondary lift structure 5 (FIG. 4) interposed by a bracket 39. The rod 31 is vertically disposed to be movable in housing 29, interposed by bushings 41 and a spring 43. The pressuring cap 33 is disposed at an upper end of the rod 31, such that, it can be pressed down by the roof panel 27. The dog 35 is disposed at a lower end of rod 31, while the detection sensor 37 is disposed below the dog 35.

Therefore, while the secondary lift structure 5 moves upward together with the base member 1, the pressing cap 33 comes into contact with the roof panel 27. The pressing cap 33 is therefore moved down by being pressed by the roof panel 27. This in turn presses the rod 31 downward forcing the dog 35 downward also. Movement of the dog 35 is detected by the detection sensor 37. When the detection sensor 37 detects the lowering of the dog 35, the primary cylinder 110 for lifting up the base member 1 is stopped.

Figure 6:
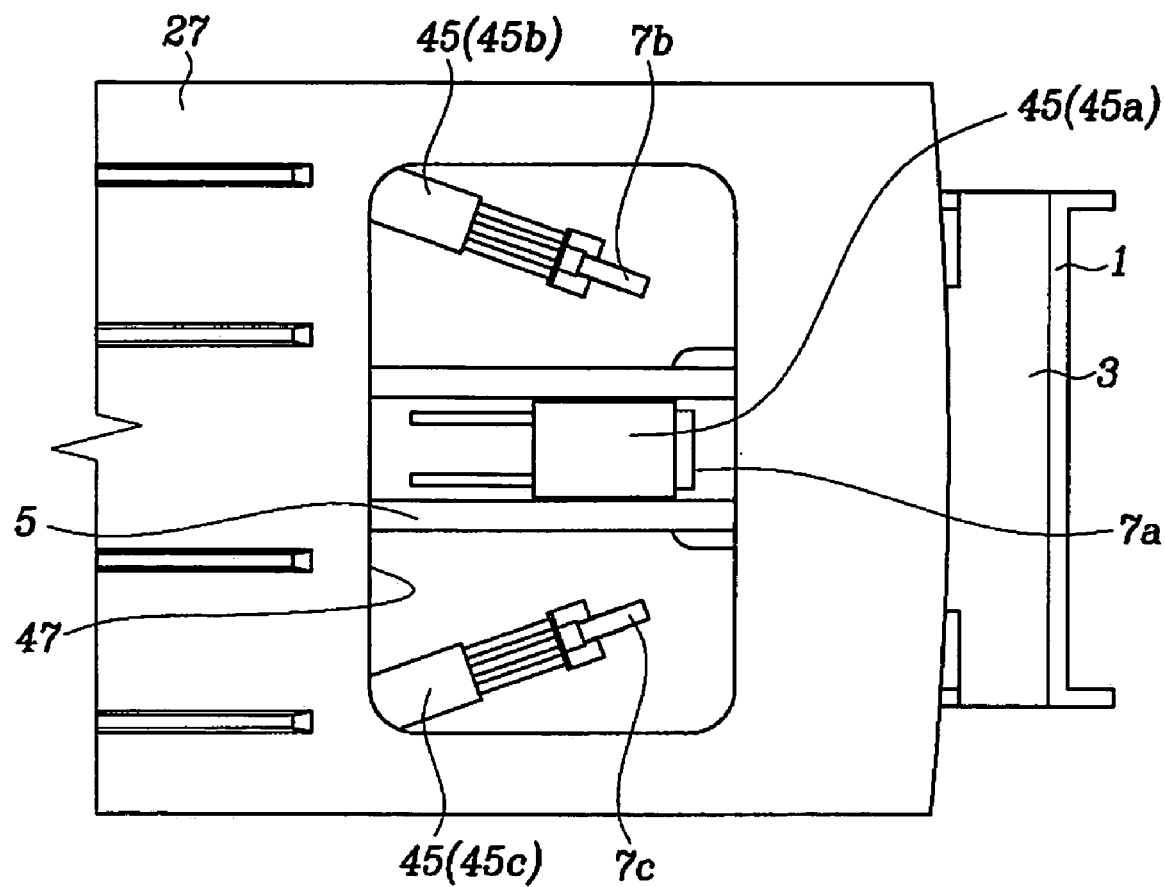
FIG. 6 illustrates operation of a centering cylinder unit in an apparatus for positioning a sunroof on a vehicle body according to an embodiment of the present invention.

A centering cylinder unit 7, connected to a centering attachment unit 45, is installed between the secondary lift structure 5 and the floating plate 3. As shown in FIG. 6, the centering attachment unit 45 comes in direct contact with a sunroof opening 47 formed in the roof panel 27 of the vehicle body, so it is customized according to specifications of vehicles to which a sunroof should be installed. The centering cylinder unit 7 moves and attaches the centering attachment unit 45 of the floating plate 3 to the sunroof mounting position (i.e., the sunroof opening 47) of the vehicle body.

In further detail and in accord with FIG. 6, the centering cylinder unit 7 includes a longitudinal centering cylinder 7a and left and right centering cylinders 7b and 7c, respectively. The centering attachment unit 45 correspondingly includes a longitudinal centering attachment member 45a and left and right centering attachment members 45b and 45c, respectively. The longitudinal centering attachment member 45a is operated by the longitudinal centering cylinder 7a and the left and right centering attachment members 45b and 45c are operated by the left and right centering cylinders 7b and 7c, respectively.

Therefore, by an operation of the longitudinal centering cylinder 7a, the longitudinal centering attachment member 45a longitudinally positions a sunroof, at the sunroof opening 47 of the roof panel 27. Operation of the left and right centering cylinders 7b and 7c centers the left and right centering attachment members 45b and 45c transversely with respect to the sunroof opening 47 of the roof panel 27. During this operation, the free cylinder 23 is in its restored state. Therefore, the fixing ring 13, at one end of the free cylinder 23, does not confine the fixing member 15, either longitudinally or transversely. That is, the floating plate 3 can freely move longitudinally and transversely.

When centering operations of the longitudinal, left, and right attachment members 45a, 45b, and 45c according to operations of the longitudinal, left, and right centering cylinders 7a, 7b, and 7c are finished, the free cylinder 11 is operated to extend. Therefore, in this case the free cylinder 11 confines the fixing member 15 with the fixing ring 13 such that the floating plate 3 is fixed in both the longitudinal and lateral directions. After fixing the floating plate 3 in position, the secondary lift cylinder 23 extends, and accordingly lifts the secondary lift structure 5.

According to an upward lifting of the secondary lift structure 5, the sunroof assembly 150 (FIG. 1) loaded thereto, is lifted up to the mounting position in the roof panel 27 of the vehicle body. The sunroof is then temporarily held in position, e.g., by a pin and hole engagement. At this stage, the sunroof assembly is engaged with the roof panel, e.g., by a bolt or a nut, such that it can be firmly positioned. Following firm engagement between the sunroof and the vehicle body the positioning apparatus is disassembled from the sunroof assembly.

As described above, according to an embodiment of the present invention, a floating plate holding a sunroof assembly can be automatically and precisely positioned to a mounting position (i.e., a sunroof opening) on a vehicle body, thereby, increasing the efficiency of a sunroof mounting process.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for positioning a sunroof with a vehicle body, comprising:
    a base member mounted to a running rail, the base member movable along and vertically to the running rail;
    a floating plate mounted to the base member, interposing a plurality of ball bearings and a free cylinder such that the floating plate is movable in longitudinal and transverse directions with respect to the base member, the floating plate having a centering attachment unit mounted thereon;
    a secondary lift structure mounted to the floating plate, interposing a secondary lift guider and a secondary lift cylinder such that the secondary lift structure is liftable with respect to the floating plate, the secondary lift structure including a sunroof attachment unit and a primary lifting shaft; and
    a centering cylinder unit disposed between the secondary lift structure and the floating plate, such that the centering cylinder unit aligns the centering attachment unit on the floating plate to a sunroof mounting position on the vehicle body.

2. The apparatus of claim 1, wherein the free cylinder is fixed to the base member and an end of said free cylinder is connected to a fixing ring such that the free cylinder firmly holds or moves a fixing member projected downward from the floating plate.

3. The apparatus of claim 1, wherein the primary lifting shaft comprises:
    a housing vertically mounted to the secondary lift structure interposing a bracket;
    a rod movably disposed in the housing;
    a pressuring cap disposed at an upper end of the rod; and
    a dog disposed at a lower end of the rod.

4. The apparatus of claim 3, further comprising a detection sensor disposed below the dog such that the detection sensor detects a lowering of the dog.

5. The apparatus of claim 1, wherein:
    the centering cylinder unit comprises a longitudinal centering cylinder and left and right centering cylinders; and
    the centering attachment unit comprises a longitudinal centering attachment member operated by the longitudinal centering cylinder, and left and right centering attachment members respectively operated by the left and right centering cylinders.

* * * * *